Dec. 9, 1947.  M. E. CHANDLER  2,432,283
CONTROL FOR INTERNAL-COMBUSTION ENGINES
Filed June 19, 1943  2 Sheets-Sheet 1

Fig. 1

INVENTOR.
MILTON E. CHANDLER
BY Lester W Clark
AGENT

Patented Dec. 9, 1947

2,432,283

UNITED STATES PATENT OFFICE 2,432,283

CONTROL FOR INTERNAL-COMBUSTION ENGINES

Milton E. Chandler, New Britain, Conn., assignor, by mesne assignments, to Niles-Bement-Pond Company, West Hartford, Conn., a corporation of New Jersey Application June 19, 1943, Serial No. 491,442

33 Claims. (Cl. 123—117)

1

The present invention relates to internal combustion engines, and particularly to means for controlling the conditions of combustion in such engines.

The efficiency of combustion in an internal combustion engine is affected by many variable factors, among which are the timing of the ignition with respect to the piston position, and the proportions of the mixture of fuel and air supplied to the engine. It has been found that for most efficient combustion, an engine should be supplied with a mixture of fuel and air which is relatively lean. In other words, the fuel to air ratio should be kept low. Furthermore, it has been found that when an engine is operating at light loads (less than half of rated load, for example), more efficient combustion may be obtained with lean mixtures if the ignition timing is advanced so that ignition occurs at some time before the piston reaches top dead center.

However, an engine which is supplied with a fuel and air mixture whose proportions are determined solely from considerations of efficient combustion would have other undesirable operating characteristics. For example, the engine could not produce the same amount of power that it might if supplied with a richer mixture, and also it might tend to overheat under certain conditions. It is therefore generally desirable to provide a mixture control by which the fuel to air ratio may be increased when the engine is operating under relatively heavy loads.

It is therefore an object of the present invention to provide improved means for controlling the ratio of fuel to air in the combustible mixture supplied to internal combustion engines.

Another object of the invention is to provide combined mixture control means and ignition timing control means for an internal combustion engine, by which the ignition timing will be advanced when the engine is operating under light loads and a lean mixture is being supplied to it.

A further object of the present invention is to provide improved means which operates automatically upon the occurrence of a predetermined fuel flow thru a carburetor to increase the fuel to air ratio of the mixture supplied by the carburetor.

Another object of the invention is to provide improved means for supplying an internal combustion engine with a lean fuel and air mixture at intermediate loads, and a rich mixture at light and heavy loads.

A further object of the present invention is to provide an improved carburetor for an internal

2 combustion engine, of the type in which the fuel supply flows through a pair of parallel branch conduits, each including a metering restriction, and a mixture control valve is operated to selectively permit the flow of fuel thru one or both of the conduits. A still further object is to provide, in a carburetor of the type described, means responsive to the difference between the differential pressures across the metering restrictions in said branch conduits for controlling the timing of the ignition of the internal combustion engine.

Other objects and advantages of my invention will become apparent from a consideration of the appended specification, claims and drawing, in which.

Figure 1:
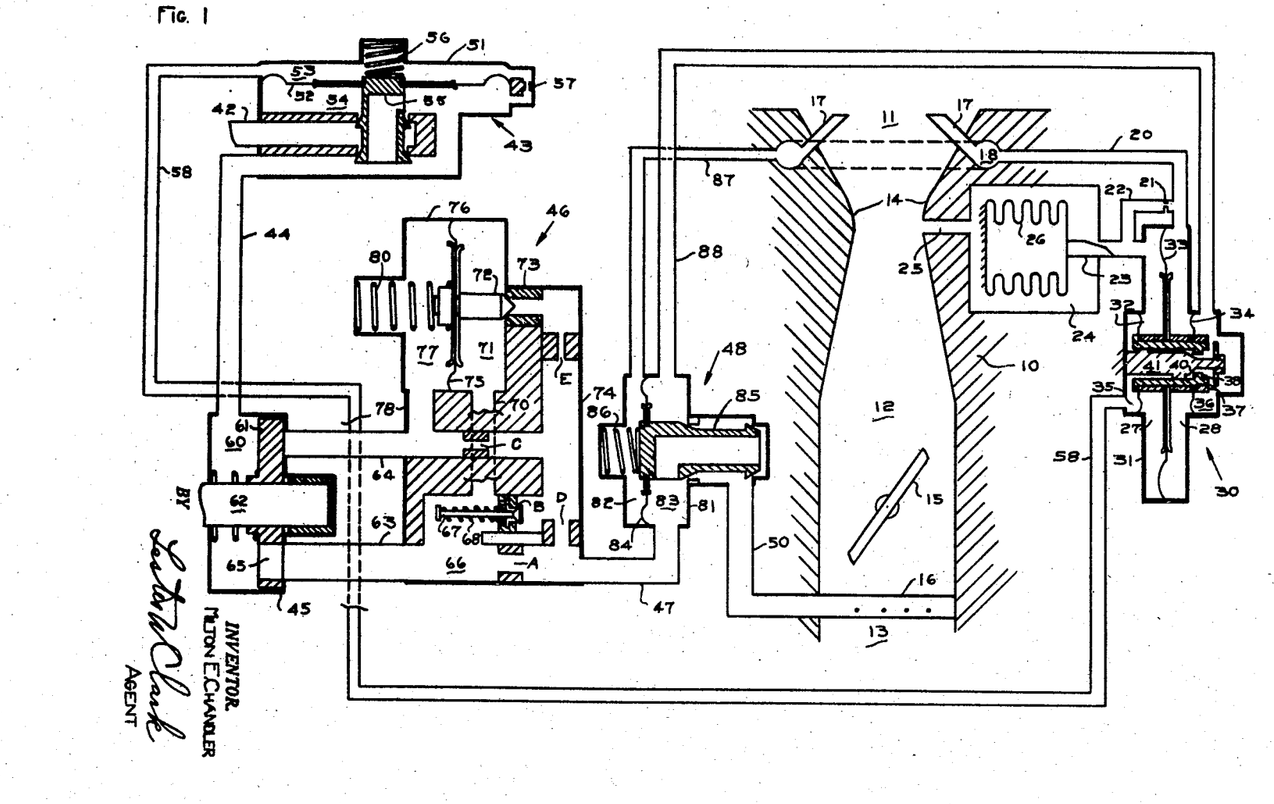
Figure 1 is a somewhat diagrammatic illustration of a carburetor for an internal combustion engine embodying the principles of my invention.

Referring now to Figure 1, there is shown a carburetor body portion 10 and an air inlet 11 formed therein and a passage 12 connecting the inlet 11 with an outlet 13. The air flowing thru the passage 12 encounters a Venturi restriction 14, and then flows past a throttle valve 15 and a fuel discharge nozzle 16 to the outlet 13.

A plurality of impact tubes 17 are located at the inlet 11 with their open ends exposed to the flow of the air entering the passage 12. The impact tubes 17 form the entrance to a second air passage connecting the inlet 11 and the throat of the Venturi restriction 14. This second air passage may be traced from the impact tubes 17 through a vent ring 18, a conduit 20, a restriction 21, a conduit 22, past a valve 23, through a valve chamber 24 and a conduit 25 to the throat of venturi 14. The valve 23 is operated by a bellows 26 located in the chamber 24 and exposed through the conduit 25 to the pressure existing at the throat of the venturi 14. The valve 23 is operated by the bellows 26 to restrict the flow of air thru the second passage previously described in a manner so that the pressure drop across the restriction 21 is substantially a true parabolic function of the mass of air flowing through the passage 12. In other words, the pressure drop varies as the square root of the mass of air.

The pressure differential established across the restriction 21 is communicated to a pair of expansible chambers 27 and 28 in a metering unit generally indicated at 30. The metering unit 30 includes a casing 31, which is divided by three flexible diaphragms 32, 33 and 34 into four expansible chambers 35, 27, 28 and 36. The diaphragms 32, 33 and 34 carry a sleeve 37, on the interior of which is formed an annular valve member 38 cooperating with a tapering seat 40 on a central post 41. The position of the valve member 38 with respect to the seat 40 controls the flow of fluid between chambers 35 and 36.

The fuel supply for the carburetor 10 is received from a suitable fuel pump or other source of fuel under pressure (not shown) and passes through a conduit 42, a fuel regulator valve unit generally indicated at 43, a conduit 44, a mixture control or selector valve 45, a jet system generally indicated at 46, a conduit 47, a pressure regulating valve unit generally indicated at 48, and a conduit 50 to the discharge nozzle 16.

The fuel regulator valve unit 43 includes a housing 51 divided by a flexible diaphragm 52 into two expansible chambers 53 and 54. A balanced valve member 55 is supported centrally of the diaphragm 52 and cooperates with a seat formed in the casing 51 to control the passage of fuel between the conduit 42 and the chamber 54, which is directly connected to the conduit 44. A spring 56 biases the valve 55 toward open position. A restricted passage 57 connects chambers 54 and 53, and the chamber 53 is connected by a conduit 58 to the chamber 35 in the metering unit 30.

The conduit 44 conducts the fuel to a chamber 60 in the mixture control or selector valve unit 45. A disc valve 61, attached to a manually rotatable shaft 62, controls the flow of fuel from the chamber 60 thru a conduit 63 and a conduit 64. The disc valve 61 is provided with a plurality of apertures, such as that indicated at 65. When the aperture 65 registers with the conduit 63, the fuel flows thru the latter conduit. The disc valve 61 is preferably so constructed that the fuel may flow either thru the conduit 63 alone or thru both conduits 63 and 64, depending upon the angular position of the shaft 62.

Fuel flowing thru the conduit 63 enters a chamber 66 in the jet system 46. From the chamber 66, the fuel may take one of three parallel paths thru the jet system 46 to the conduit 47. The most direct of the three paths is thru a restriction or jet A. Another path is thru jets B and D in series to the conduit 47. The jet B is normally closed by an enrichment valve 67 biased to closed position by a spring 68. The valve 67 opens only when the pressure differential across the jet B exceeds a predetermined value. The third path between the chamber 66 and conduit 47 is thru a conduit 70, a valve chamber 71, past an enrichment valve 72, and thru a conduit 73, a jet E, a conduit 74 and jet D to the conduit 47.

When the disc valve 61 is positioned so that fuel also flows thru conduit 64, that fuel passes thru a jet C, the conduit 74 and jet D to the conduit 47.

The valve 72 is attached to the central portion of a flexible diaphragm 75 which is attached at its edges to a casing 76, and forms within the casing 76 a pair of expansible chambers 77 and 71. The chamber 71 is connected thru the conduit 70 to the chamber 66, as previously described. The chamber 77 is connected thru a conduit 78 to the conduit 64. A spring 80 within the housing 76 biases the valve 72 toward its closed position.

The pressure regulator unit 48 includes a housing 81 divided into expansible chambers 82 and 83 by a diaphragm 84. A balanced valve member 85 is attached to the center of the diaphragm 84, and is biased to closed position by a spring 86. The chamber 82 is vented thru a conduit 87 to the vent ring 18. The valve 85 is positioned in accordance with the balance between the pressure in the chamber 83 and the pressure in chamber 82 aided by the force of spring 86. The pressure in chamber 82 is small relative to the force of the spring 86 and to the pressure in chamber 83, and hence has little controlling effect on the position of valve 85. The function of the pressure regulator unit 48 is to maintain a substantially constant pressure of the fuel in the chamber 83, so that the flow of fuel thru the jet system 46 will not be adversely affected by variations in the pressure adjacent the discharge nozzle 13.

*Operation of Figure 1*

The flow of fuel thru the regulator unit 43 is controlled by the pressure differential between the chambers 53 and 54. This pressure differential is in turn controlled by the metering unit 30. A portion of the fuel entering the chamber 54 passes thru the restriction 57 to chamber 53, and thence thru conduit 58 to chamber 35 in the metering unit 30. From there this fuel flows past the valve member 38 to the chamber 36 and out thru the conduit 88 to the chamber 83 in the pressure regulator 48. The pressure in chamber 53 and hence the position of valve 55 is controlled by the position of valve 38 with respect to its seat 40. The position of valve 38 is determined by the pressure differential across the restriction 21, which pressure differential is a measure of the quantity of air flowing thru the passage 12. Upon an increase in the flow of air thru the passage 12, which might be caused by an opening movement of the throttle 15, the pressure differential across the restriction 21 increases, and this pressure differential transmitted to the chambers 27 and 28 of the metering unit 30 causes a movement of valve 38 toward the seat 40, thereby further restricting the flow of fuel thru the valve. This restriction of the fuel flow causes the pressure to build up in the chamber 35, conduit 58, and chamber 53 of fuel regulating unit 43. The increase in pressure in the chamber 53 moves valve member 55 toward open position, thereby increasing the pressure in chamber 54. Since the pressure at the outlet of the jet system 46 is maintained substantially constant by the pressure regulator 48, it may be seen that the pressure differential in the fuel conduit across the jet system 46 is made to vary in proportion to the pressure differential across restriction 21. Since, as previously pointed out, the pressure differential across the restriction 21 varies as the square root of the mass of air flowing thru the carburetor, and since the flow thru a fixed restriction varies as the square of the pressure differential across it, then it becomes apparent that the quantity of fuel discharged thru the nozzle 16 is controlled in accordance with the quantity of air flowing thru the passage 12.

This relationship holds only so long as the cross-sectional area of the metering restriction in the jet system 46 remains constant. In other words, the relationship holds for any one jet, or any group of jets, in the jet system 64.

In a carburetor of the type described, it has been found that at small air flows the fuel flow does not vary as a linear function of air flow, because of the difficulties and inaccuracies inherent in measuring small air flows in a venturi meter designed for considerably greater flows. Therefore such carburetors are so designed that the fuel flow is disproportionately large as compared to the air flow, when the air flow is below a predetermined value. This effect is obtained by the use of spring 56, which biases valve 55 in a fuel flow increasing direction. At low air flows, the pressure in chamber 53 is low as compared to the force of spring 56, and the spring therefore operates valve 55 to increase the fuel flow above the value indicated by the pressure in chamber 53. For example, when the mixture control 61 is positioned so that fuel is flowing thru the conduit 63 and not thru the conduit 64, then the fuel and air ratio varies with air flow according to a characteristic such as that illustrated by the curve F of Figure 5. From zero air flow to the point 90, the characteristic is non-linear, but for higher air flows the fuel to air ratio is constant. If the fuel flow continued to take place only thru the jet A, the fuel to air ratio would remain substantially constant over a considerable range of air flow variation. However, it is desired to increase the fuel to air ratio at higher air flows, in order that the power output of the engine may increase. This is done, in the carburetor of Figure 1, by the operation of enrichment valves 72 and 67.

As the fuel flow increases, the pressure in the chamber 66 increases with the opening movement of the valve 55. The pressure in chamber 71 likewise increases, since it is connected to chamber 66 by the conduit 70. The pressure in the chamber 77 however remains substantially constant and equal to that on the discharge side of jet A, since the chamber 77 is connected to the discharge side of jet A thru conduit 78, jet C, conduit 74 and jet D. The chambers 77 and 71 are so connected that the pressure differential between them is equal to the difference between the pressure drop across jet A and the drop across jets C and D in series.

When the pressure differential between chambers 71 and 77 becomes sufficient to overcome the spring 80, the enrichment valve 72 is moved to open position and fuel starts flowing thru the path from chamber 66 thru conduit 70, chamber 71, conduit 73, jet E, conduit 74 and jet D to conduit 47. This fuel flow past the jet D establishes a pressure differential across it. Because of this pressure differential, the pressure in chamber 77 rises, and the pressure differential between chamber 71 and 77 decreases. The valve 72 therefore reaches a balanced position at which the fuel flow thru it is just enough that the pressure differential established across jet D maintains the valve stationary. Referring again to Figure 5, the curve F between points 91 and 92 illustrates the variation of the fuel and air ratio with air flow during the time the jets A and E are both open.

Upon further increasing pressure in the chamber 66, a point is reached where the pressure is sufficient to overcome the spring 68 and open the jet B, whereupon the fuel flow thru the carburetor is determined by the combined characteristics of the jets A, B, D and E. The variation of the fuel and air ratio with air flow under these conditions is illustrated by the curve F between the point 92 and the maximum air flow.

Figures 2, 3, 4, 5:
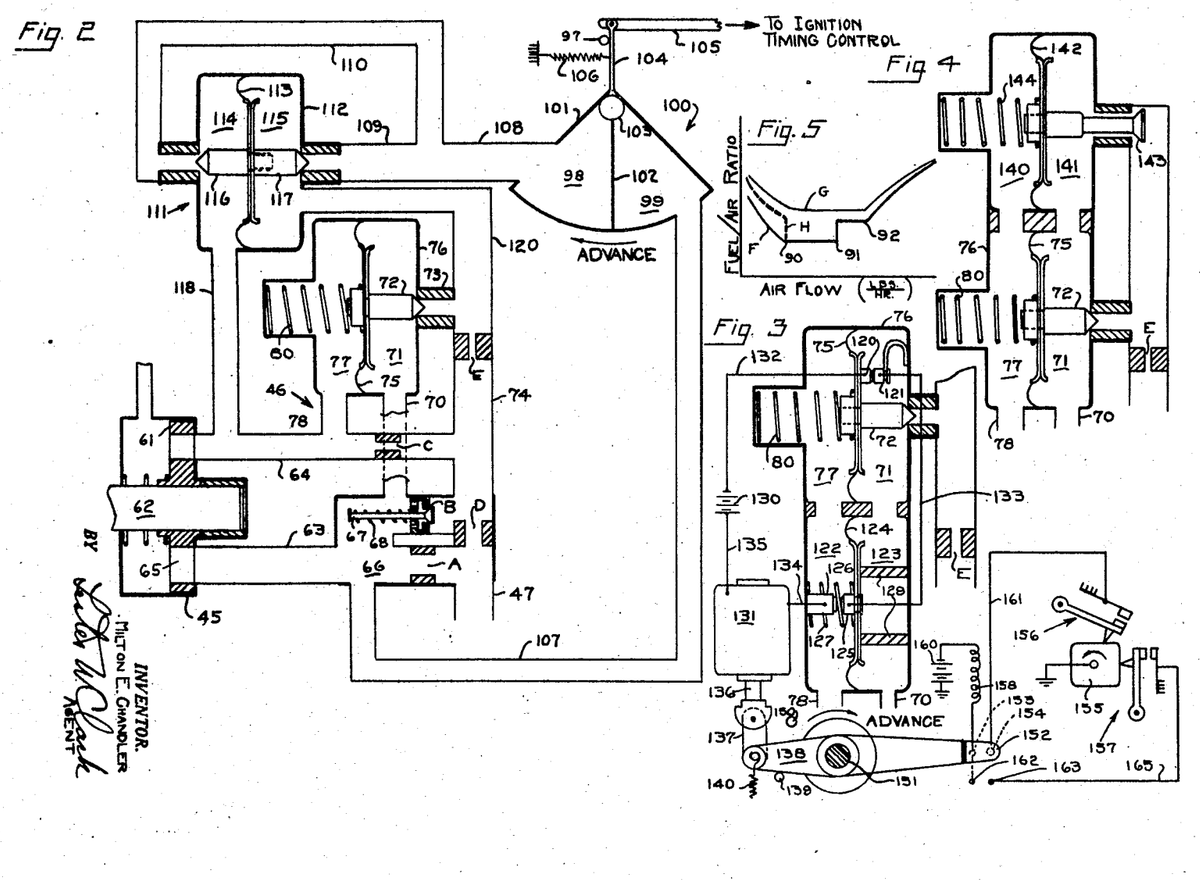
Figure 2 is a somewhat diagrammatic illustration of a mixture and ignition timing control arrangement which may be used in the carburetor of Figure 1.
Figure 3 is a diagrammatic illustration of a different form of mixture and ignition timing control means which may be used in the carburetor of Figure 1.
Figure 4 illustrates another modified form of mixture control which may be used in the carburetor of Figure 1.
Figure 5 is a graphical illustration of the relationship between the fuel to air ratio and the quantity of air flowing thru the carburetor in the various arrangements herein illustrated.

The purpose of the jet D is to limit the total flow thru jets B, C, and E, and hence the effect of jet D appears in Figure 5 at the point where the curve F starts to flatten out, near maximum air flow.

When both the conduits 63 and 64 are opened by the disc valve 61, there is no pressure differential between chambers 71 and 77. Therefore the valve 72 is maintained closed, and the characteristic variation of fuel and air ratio with air flow thru the carburetor is then illustrated by the curve G in Figure 5. The shape of this curve is determined by the characteristics of jets A, B, C and D in combination. The characteristic illustrated by the curve G of Figure 5 is quite conventional in aircraft carburetors.

*Figure 2*

There is shown in Figure 2 an arrangement by which the jet and mixture control system of Figure 1 may be adapted to control the ignition timing of the associated engine in such a manner that the timing will be advanced whenever the engine is running at light loads with a lean mixture. Those elements in Figure 2 which correspond to equivalent elements in Figure 1 have been given the same reference characters.

There is shown in Figure 2 a hydraulic servomotor 100, of the rotating vane type. The servomotor 100 comprises a casing 101, in the form of a quadrant. A vane 102 is mounted on a shaft 103 at the center of the quadrant, and separates the casing into two chambers 98 and 99. An arm 104 is attached to the shaft at one end and at its opposite end to a link 105, which may be connected to any suitable ignition timing control device (not shown). A spring 106 biases the arm 104 against a stop 97, so that the arm 104 tends to remain in the position shown in the drawing.

A conduit 107 connects the chamber 66 of the jet system 46 to the chamber 99 of servomotor 100. The chamber 98 is connected thru conduits 108 and 109 or 110 to a selector valve unit 111. The selector valve unit 111 comprises a casing 112 divided by a diaphragm 113 into a pair of expansible chambers 114 and 115. The diaphragm 113 supports at its center a pair of oppositely extending valves 116 and 117. The construction is such that when the pressure in chamber 114 exceeds that in chamber 115, the valve 117 is moved to the position shown in the drawing, where it closes the conduit 109, and opens the connection between conduit 110 and chamber 114. When the pressure in chamber 115 is greater than that in chamber 114, the valve members are moved to the left until the valve 116 closes the conduit 110 and valve 117 opens the connection between conduit 109 and chamber 113. The chamber 98 in the servomotor 100 is therefore selectively connected to that one of the chambers 114 or 115 which has the highest pressure in it.

The chamber 114 is connected thru a conduit 118 to the conduit 64, and the chamber 115 is connected thru conduit 120 to the conduit 73.

When the mixture control selector valve 61 is in the position shown in the drawing, wherein both the conduits 63 and 64 are open, the valve 72 is closed since the pressures in the chambers 71 and 77 are equal. Therefore no fuel is flowing past jet E and the pressure in chamber 115 is the same as that on the discharge side of jet C.

The pressure in chamber 114 however is the same as that on the upstream side of jet C, so that the valves 116 and 117 are operated to the positions shown in the drawing. The pressure in chamber 114 is then transmitted to the chamber 98 in servomotor 100 and balances the equal pressure supplied to chamber 99 from the upstream side of jet A, so that the vane remains in the central position shown.

Now let it be assumed that the mixture control valve 61 is operated to cut off the flow of fuel thru conduit 64, and that the flow thru conduit 63 is sufficiently high so that the valve 72 is moved to open position, as described in connection with Figure 1. There is then no fuel flowing thru jet C, so that the pressure in chamber 114 is the same as that on the discharge side of jet E. Fuel is flowing thru jet E however and the pressure in chamber 115 is the same as that on the upstream side of jet E. Therefore the valves 116 and 117 are moved to the left so that valve 116 obstructs the passage 110 and valve 117 opens the passage 109 to the flow of fuel. The pressure in the chamber 98 is then substantially the same as that in chamber 66, to which it is connected, and is therefore the same as the pressure in chamber 99. The vane is again balanced and remains in the central position shown in the drawing.

Now let it be assumed that the fuel flow thru the carburetor decreases until the valve 72 closes, as explained in connection with Figure 1, and that the mixture control valve 61 remains in the position where the conduit 64 is closed and the conduit 63 is opened. Under such conditions no fuel is flowing thru either jet C or jet E, so that the chambers 114 and 115 are at the same pressure. The positions of the valve members 116 and 117 at this time are therefore immaterial. The operation of the system is the same whatever position they assume. Under these conditions no fuel is flowing thru jets C, D, or E, and hence the pressure in the chamber 98 is the same as that on the discharge side of jet A, while the pressure in the chamber 99 is the same as that on the inlet side of jet A. The vane 102 is therefore moved to the left from the position shown in the drawing and operates the ignition timing mechanism to advance the ignition timing.

Under these conditions, as the fuel flow continues to decrease, the pressure drop across jet A decreases and eventually reaches a value so small that it is not sufficient to overcome spring 106. Thereupon the spring 106 moves the vane 102 and the ignition timing control mechanism to its normal timing position. The spring 106 is preferably chosen so that this movement takes place at an air flow equal to that existing at the point 90 in Figure 5.

Figure 3

There is shown in Figure 3 an arrangement for securing the same type of ignition control shown in Figure 2 by an electrically operated control system. As in the case of Figure 2, those elements in Figure 3 which correspond to equivalent elements in Figure 1 have been given the same reference characters.

In Figure 3, the diaphragm 75 which carries the valve 72 also carries a movable switch contact 120 which cooperates with a resiliently supported stationary contact 121. Although these contacts are shown as positioned within the chamber 71, thru which fuel is flowing, it should be realized that this is a diagrammatic illustration only, and that in any practical device the contacts would not be located in the flowing fuel because of the danger of explosion resulting from sparking at the contacts. The contacts 120 and 121 are arranged to close when the valve 72 is closed.

Connected in parallel with the chambers 77 and 71 is another pair of chambers 122 and 123, separated by a flexible diaphragm 124. The diaphragm 124 carries a movable contact 125 which cooperates with a stationary contact 126. A spring 127 biases the diaphragm 124 against a pair of stops 129, in which position the contacts 125 and 126 are separated.

As previously pointed out, the chambers 77 and 71 are so connected that they are responsive to the difference between the pressure drop across the restrictions C and D in series and the pressure drop across the jet A. When there is no difference between these two pressure drops, as when the mixture control valve 61 is positioned to permit fuel flow thru both conduits 63 and 64, the diaphragm 75 is moved by the spring 80 to close the valve 72 and to move contact 120 into engagement with contact 121. At the same time, spring 127 moves diaphragm 124 to separate the contacts 125 and 126.

The contacts 120 and 121, and the contacts 125 and 126 are connected in a series circuit with a battery 130 and electromagnet 131. This circuit may be traced from the upper terminal of battery 130 thru a conductor 132, contacts 120 and 121, a conductor 133, contacts 125 and 126, a conductor 134, electromagnet 131 and a conductor 135 to the lower terminal of battery 130.

The electromagnet 131 has an armature 136, which is attached by a link 137 to an ignition timing control lever 138. A spring 140 biases the lever 138 against a stop 139, and thereby acts thru link 137 on the armature 136 to maintain the latter in its retracted position. Upon energization of electromagnet 131, the armature 136 is moved upwardly, thereby moving the lever 138 against a stop 150.

The lever 138 is pivoted at 151, and insulatingly carries at its opposite end a movable contact 152. The contact 152 is a part of an ignition timing control mechanism which includes a cam 155 cooperating with two sets of breaker points 156 and 157. The two sets of breaker points are selectively connected in series with the primary winding 158 of an induction coil (not completely shown) and a battery 160.

When the contact 152 is in the position shown in the drawing, it bridges a pair of stationary contacts 153 and 154. The energizing circuit for coil 158 may then be traced from the upper terminal of battery 160 thru coil 158, contacts 153, 152 and 154, a conductor 161, breaker points 156, and cam 155 to ground, and thru ground to the lower terminal of battery 160. This is the normal condition of the ignition timing control mechanism, wherein the ignition timing is controlled by the operation of breaker points 156.

When the electromagnet 131 is energized, the armature 136 is moved upwardly to its attracted position, carrying lever 138 against stop 150, and moving contact 152 to bridge two stationary contacts 162 and 163. The energizing circuit for coil 158 may then be traced from the upper terminal of battery 160 thru coil 158, contacts 162, 152, and 163, a conductor 165, breaker points 157 and cam 155 to ground, and thence to the grounded lower terminal of battery 160. The cam 155 rotates counter-clockwise, as indicated by the legend in the drawing. Therefore, the ignition timing is advanced when the lever 138 is moved so that contact 152 bridges the stationary contacts 162 and 163, since the breaker points 157 open at an earlier time in the revolution of cam 155 than the points 156.

When the mixture control valve 61 is positioned so that fuel flows only thru conduit 63, and the rate of flow is sufficiently high that the valve 72 is opened, then the electrical circuit just described is opened at the contacts 120 and 121. Therefore the electromagnet 131 is not energized and the ignition timing remains in its normal condition. The relative strengths of the springs 80 and 127 are such that, as the fuel flow decreases, the diaphragm 75 is moved to close the contacts 120 and 121 before the diaphragm 124 is moved to open the contacts 125 and 126. When the pressure differential between the chambers 71 and 77 is in that range of values which occurs at air flows between the values indicated by the points 90 and 91 of Figure 5, then the circuit is completed thru both sets of contacts 120 and 121 and 125 and 126. The electromagnet 121 is then energized and operates the ignition timing control device to advance the spark. Spring 127 should preferably be chosen so that the contacts 125 and 126 do not open as long as the flow thru jet A is greater than that required for idling purposes.

Figure 4

There is shown in Figure 4 an arrangement adaptable for use with the mixture control system of Figure 1 so that when the mixture control valve 61 is in its lean position the fuel and air ratio will be increased at low and high fuel flows and decreased at intermediate fuel flows.

In the arrangement of Figure 4, a pair of chambers 140 and 141 are connected in parallel with chambers 77 and 71. The chambers 140 and 141 are separated by flexible diaphragm 142, which carries an idle enrichment valve 143 biased to open position by a spring 144. The relative strengths of the springs 80 and 144 are chosen so that power enrichment valve 72 is opened whenever the air flow is above a predetermined value, which may be, for example, 50% of the maximum air flow, and the valve 143 is opened when the flow decreases below, for example, 20% of the maximum. Therefore, it may be seen that a carburetor equipped with the jet system of Figure 4 supplies its associated engine with a lean mixture when the engine load is between 20% and 50% of its rated value, and that a somewhat richer mixture is supplied when the engine load is below 20% and above 50% of its rated value.

The relationship between the fuel and air ratio and the fuel flow obtained with the system of Figure 4 is illustrated by the curve F of Figure 5 as modified at low values of air flow by the curve H.

The valve 143 will open whenever the mixture control valve is in its rich position so that fuel then flows thru both conduits 63 and 64. This amounts to a fixed increase in the cross-sectional area of the jet C, and may be compensated in the design of the jet C.

While I have shown and described certain preferred embodiments of my invention, other modifications thereof will occur to those skilled in the art and I therefore intend that my invention shall be limited only by the appended claims.

I claim as my invention:

1. In an internal combustion engine, in combination, ignition timing control means, fuel supply control means including a main conduit for the fuel flowing thru said carburetor and a pair of parallel branch conduits, each said branch conduit having a restriction therein, mixture control valve means for selectively permitting the flow of fuel thru one or both of said branch conduits, fuel flow controlling means for varying the fuel flow thru said main conduit and hence the pressure differential across said restrictions, and means for operating said ignition timing control means and effective to advance the ignition timing only when said mixture control valve means is in position to permit fuel flow thru said one branch conduit only, and the pressure differential across the restriction in said one branch conduit exceeds a predetermined value.

2. In an internal combustion engine, in combination, ignition timing control means, fuel supply control means including a main conduit for the fuel flowing thru said carburetor and first and second branch conduits, each said branch conduit having a restriction therein, mixture control valve means for selectively permitting the flow of fuel thru either the first or both of said branch conduits, fuel flow controlling means for varying the fuel flow thru said main conduit and hence the pressure differential across said restrictions, a third branch conduit including a valve and a fixed restriction and connected in parallel with the restriction in said first branch conduit, means for operating said valve in accordance with the difference between the pressure differentials across the restrictions in said first and second conduits, fluid motor means for operating said ignition timing control means including a pair of expansible chambers, a movable wall separating said chambers, and means connecting said wall to said ignition timing control means, means for supplying one of said chambers with fuel at the pressure existing adjacent one side of the restriction in said one branch conduit, and means for selectively supplying the other of said chambers with fuel at the higher of the two pressures existing adjacent the corresponding sides of the restrictions in said second and third branch conduits so that the pressures in both said chambers are the same whenever both said first and second branch conduits are open or whenever only said first branch conduit is open and the pressure differential across the restriction therein is greater than a predetermined value, and so that the pressure in said one chamber is higher than the pressure in said other chamber whenever only said one branch conduit is open and the pressure differential across the restriction therein is less than said predetermined value, said fluid motor means being effective when the pressures in said chambers are balanced to operate said ignition timing control means to a normal position, and effective when the pressure in said one chamber is higher than the pressure in said other chamber to operate said ignition timing control means to advanced position.

3. In an internal combustion engine, in combination, ignition timing control means, fuel supply control means including a main conduit for the fuel flowing thru said carburetor and first and second parallel branch conduits, each said branch conduit having at least one restriction therein, mixture control valve means for selectively permitting the flow of fuel thru either the first or both of said branch conduits, fuel flow controlling means for varying the fuel flow thru said main conduit and hence the pressure differential across said restrictions, means responsive to the difference between the pressure differentials across the restrictions in said first and second conduits, and effective when said difference lies within a predetermined range of values to operate said ignition timing control means to an advanced position, and effective when said difference lies without said range to operate said ignition timing control means to a normal position.

4. In an internal combustion engine, in combination, ignition timing control means, fuel supply control means including a main conduit for the fuel flowing thru said carburetor and first and second parallel branch conduits, each said branch conduit having at least one restriction therein, mixture control valve means for selectively permitting the flow of fuel thru either the first or both of said branch conduits, fuel flow controlling means for varying the fuel flow thru said main conduit and hence the pressure differential across said restrictions, a third branch conduit including a valve and a fixed restriction and connected in parallel with the restriction in said first branch conduit, means for operating said valve in accordance with the difference between the pressure differentials across the restrictions in said first and second conduits, and means responsive to the difference between the pressure in said first conduit at a point between the restriction therein and said mixture control valve means and the greater of the two pressures at corresponding points in said second and third conduits for operating said ignition timing control means.

5. In an internal combustion engine, in combination, ignition timing control means, means biasing said control means to a normal position, fuel supply control means including a main conduit for the fuel flowing thru said carburetor and first and second branch conduits, each said branch conduit having at least one restriction therein, mixture control valve means for selectively permitting the flow of fuel thru either the first or both of said branch conduits, fuel flow controlling means for varying the fuel flow thru said main conduit and hence the pressure differential across said restrictions, an electrical circuit, switch means for opening and closing said circuit, means for operating said switch means in accordance with the difference between the pressure differentials across the restrictions in said pair of conduits, so as to close said circuit when said difference lies within a predetermined range of values, and means responsive to closure of said circuit for operating said ignition timing control means to an advanced position.

6. In an internal combustion engine, in combination, ignition timing control means, means biasing said control means to a normal position, fuel supply control means including a main conduit for the fuel flowing thru said carburetor and first and second parallel branch conduits, each said branch conduit having at least one restriction therein, mixture control valve means for selectively permitting the flow of fuel thru either the first or both of said branch conduits, fuel flow controlling means for varying the fuel flow thru said main conduit and hence the pressure differential across said restrictions, an electrical circuit, first and second switches connected in series in said circuit, operating means for each of said switches, both said operating means being responsive to the difference between the pressure differentials across the restrictions in said pair of conduits, the operating means for one of said switches being effective to close said one switch when said difference exceeds a first predetermined value, and the operating means for the other switch being effective to close said other switch when said difference is less than a second predetermined value greater than said first value, so that said circuit is completed when said difference lies between said values, and means responsive to closure of said circuit for operating said ignition timing control means to an advanced position.

7. In an internal combustion engine, in combination, ignition timing control means, means for controlling the ratio of fuel and air supplied to said engine, and means responsive to said ratio and to the quantity of fuel supplied to said engine for operating said ignition timing control means to advance the ignition timing when said ratio is lean and said quantity is below a predetermined value.

8. In a carburetor for an internal combustion engine, in combination, means for controlling the flow of air thru said carburetor, means for controlling the flow of fuel thru said carburetor, means for establishing a normal fuel to air ratio, means operative as an incident to an increase of air flow above a predetermined value to increase said fuel to air ratio, ignition timing control means, and means for operating said ignition timing control means simultaneously with said ratio increasing means so as to retard said ignition timing when said ratio is increased and to advance said ignition timing when said ratio is decreased.

9. In a charge forming device for an internal combustion engine, in combination, a pump for supplying fuel under pressure to said engine, a conduit for the fuel flowing from said pump, a metering restriction in said conduit, fuel flow controlling means for varying the pressure differential across said restriction, ignition timing control means movable between a normal position and an advanced position, means biasing said ignition timing control means to said normal position, means responsive to said pressure differential for operating said ignition timing control means against said biasing means, said operating means being effective when said differential exceeds a first predetermined value to operate said ignition timing control means to said advanced position, and additional means responsive to said pressure differential and effective when said differential exceeds a second predetermined value greater than said first value to render said operating means ineffective so that said biasing means operates said ignition timing control means to normal.

10. In a charge forming device for an internal combustion engine, in combination, a pump for supplying fuel under pressure to said engine, a conduit for the fuel flowing from said pump, a metering restriction in said conduit, fuel flow controlling means for varying the pressure differential across said restriction, ignition timing control means movable between a normal position and an advanced position, means biasing said ignition timing control means to said normal position, valve means for varying the effective area of said restriction, means biasing said valve means to closed position, first means responsive to said pressure differential for operating said ignition timing control means to said advanced position against said biasing means, and second means responsive to said differential and effective when said differential exceeds a predetermined value to render said first means ineffective so that said ignition timing control means is operated to said normal position by its associated biasing means and simultaneously to open said valve means against its associated biasing means.

11. In a charge forming device for an internal combustion engine, in combination, a pump for supplying fuel under pressure to said engine, a conduit for the fuel flowing from said pump, a metering restriction in said conduit, fuel flow controlling means for varying the pressure differential across said restriction, a combustion control device associated with said engine and movable between a first position wherein it tends to oppose an excessive rise in the engine temperature and a second position wherein it increases the efficiency of the engine, means biasing said control device to said first position, means responsive to said pressure differential for operating said control device against said biasing means, said operating means being effective when said differential exceeds a first predetermined value to operate said control device to said second position, and additional means responsive to said pressure differential and effective when said differential exceeds a second predetermined value greater than said first value to cause operation of said control device to said first position.

12. In a carburetor for an internal combustion engine, in combination, a conduit for the fuel flowing to said engine, a metering restriction in said conduit, fuel flow controlling means for varying the pressure differential across said restriction, a combustion control device associated with said engine and movable between a first position wherein it tends to oppose an excessive rise in the engine temperature and a second position wherein it increases the efficiency of the engine, means biasing said control device to said first position, means responsive to said pressure differential for operating said control device against said biasing means, said operating means being effective when said differential exceeds a first predetermined value to operate said control device to said second position, and additional means responsive to said pressure differential and effective when said differential exceeds a second predetermined value greater than said first value to cause operation of said control device to said first position.

13. Control apparatus for an internal combustion engine, comprising means for controlling the ignition timing of said engine, a conduit for supplying air to said engine for combustion purposes, means associated with said conduit for producing two unequal pressures whose difference is a measure of the quantity of air flowing therethru, means for controlling the ratio of fuel to air supplied to said engine including a member movable between a first position corresponding to a lean fuel to air ratio and a second position corresponding to a rich fuel to air ratio, means effective when said member is in said first position and the difference of said pressures exceeds a predetermined value to operate said ignition timing control means to establish ignition timing more advanced than normal and means effective upon movement of said member to said second position to cause operation of said ignition timing control means to establish normal ignition timing.

14. Control apparatus for an internal combustion engine, comprising two expansible chambers separated by a movable wall, means operated by said wall for controlling the ignition timing of said engine, means biasing said wall to a position wherein normal ignition timing is established by said control means, means for supplying fluid to said chambers under two unequal pressures so that the difference between said pressures acts on said diaphragm in a direction opposed to said biasing means, and means operable to establish fluid communication between said chambers so that said biasing means operates said wall to cause establishment of normal ignition timing.

15. Control apparatus for an internal combustion engine, comprising two expansible chambers separated by a movable wall, means operated by said wall for controlling the ignition timing of said engine, means biasing said wall to a position wherein normal ignition timing is established by said control means, a conduit for supplying air to said engine for combustion purposes, means for supplying fluid to said chambers under two unequal pressures whose difference varies in accordance with the quantity of air flowing thru said conduit with the force due to said difference in pressures acting on said diaphragm in a direction opposed to said biasing means, and means operable to establish fluid communication between said chambers so that said biasing means operates said wall to cause establishment of normal ignition timing.

16. Control apparatus for an internal combustion engine, comprising two expansible chambers separated by a movable wall, means operated by said wall for controlling the ignition timing of said engine, means biasing said wall to a position wherein normal ignition timing is established by said control means, a conduit for supplying air to said engine for combustion purposes, means for supplying fluid to said chambers under two unequal pressures whose difference varies in accordance with the quantity of air flowing thru said conduit, means for controlling the ratio of fuel to air supplied to said engine including a member movable between a first position corresponding to a lean fuel to air ratio and a second position corresponding to a rich fuel to air ratio, and means operative as an incident to movement of said member to said second position to establish fluid communication between said chambers so that said biasing means operates said wall to cause establishment of normal ignition timing.

17. Control apparatus for an internal combustion engine, comprising a first conduit for air flowing to said engine for combustion purposes, means for producing two unequal pressures whose difference is a measure of the quantity of air flowing thru said first conduit, a second conduit for fuel flowing to said engine, metering restriction means in said second conduit, means responsive to said difference of pressures for controlling the pressure differential across said restriction means and hence the quantity of fuel flowing therethru, means including a valve for controlling the effective cross-sectional area of said restriction means to control the ratio of fuel to air supplied to said engine, said valve being effective when open to increase said ratio and when closed to decrease said ratio, ignition timing control means including a movable member, means biasing said member to a position in which said control means establishes normal ignition timing, and means subject to the pressure differential across said valve to operate said ignition timing means against said biasing means said biasing means being effective whenever said valve is open to cause establishment of normal ignition timing.

18. Control apparatus for an internal combustion engine, comprising a conduit for fuel flowing to said engine, metering restriction means in said conduit, means including a valve for controlling the effective cross-sectional area of said restriction means to control the ratio of fuel to air supplied to said engine, said valve being effective when open to increase said ratio and when closed to decrease said ratio, ignition timing control means including a movable member, means biasing said member to a position in which said control means establishes normal ignition timing, and means subject to the pressure differential across said valve means to operate said ignition timing means against said biasing means, said biasing means being effective whenever said valve is open to cause establishment of normal ignition timing.

19. Control apparatus for an internal combustion engine, comprising means for controlling the flow of air to said engine for combustion purposes, ignition timing control means, means for varying the ratio of fuel to air supplied to said engine, and means variable in accordance with said air flow for operating said ignition timing control means and said ratio varying means, said last-named means being effective when said air flow is in an intermediate range of values to advance said timing and to decrease the ratio of fuel to air supplied to said engine, and to restore said timing and said fuel to air ratios to their respective normal conditions when said air flow is outside said range.

20. Control apparatus for an internal combustion engine, comprising means for controlling the flow of air to said engine for combustion purposes, ignition timing control means operable between normal and advanced timing positions, means for varying the ratio of fuel to air supplied to said engine and movable between normal and lean mixture positions, and means variable in response to said air flow for operating said ignition timing control means and said ratio varying means, said air flow responsive means being effective when said air flow is in an intermediate range of values to advance said timing and to decrease the ratio of fuel to air supplied to said engine, and to restore said timing and said fuel to air ratios to their respective normal conditions when said air flow is outside said range.

21. Control apparatus for an internal combustion engine, comprising ignition timing control means, means for producing a force varying as a function of the quantity of air supplied to said engine for combustion purposes, means responsive to said force and effective when said quantity lies within a predetermined range of values to operate said ignition timing control means to advance the timing and when said quantity is outside said range to operate said ignition control means to establish normal timing, and means operable to discontinue control of said ignition timing control means in accordance with said force and to cause operation of said ignition timing control means to establish normal timing.

22. Control apparatus for an internal combustion engine, comprising ignition timing control means, means for producing a force varying as a function of the quantity of air supplied to said engine for combustion purposes, means responsive to said force and effective when said quantity lies within a predetermined range of values to operate said ignition timing control means to advance the timing and when said quantity is outside said range to operate said ignition timing control means to establish normal timing, means for controlling the ratio of fuel to air supplied to said engine including a member movable between a first position corresponding to a lean fuel to air ratio and a second position corresponding to a rich fuel to air ratio, and means operated as an incident to movement of said member to said second position to discontinue control of said ignition timing control means in accordance with said force and to cause operation of said ignition timing control means to establish normal timing.

23. In a fuel supply system for an internal combustion engine, a main fuel conduit, a pair of parallel branch conduits connected to said fuel conduit, mixture control valve means movable between a first position wherein fuel may flow only thru one of said branch conduits and a second position wherein fuel may flow thru both of said branch conduits, a metering restriction in each of said branch conduits, means for controlling the fuel pressure differential across said branch conduits to regulate the rate of flow of fuel thru said main conduit, an auxiliary control device movable between first and second positions, means biasing said device to said first position, means for operating said device to said second position against said biasing means including a pair of expansible chambers separated by a movable wall, means for communicating said fuel pressure differential to said chambers so that said wall is moved against said biasing means when said fuel pressure differential exceeds a predetermined value, and means operative as an incident to movement of said mixture control valve means to its second position to equalize the pressures in said chambers so that said wall is positioned by said biasing means.

24. In a fuel supply system for an internal combustion engine, a main fuel conduit, a pair of parallel branch conduits connected to said fuel conduit, mixture control valve means movable between a first position wherein fuel may flow only thru one of said branch conduits and a second position wherein fuel may flow thru each of said branch conduits, a metering restriction in each of said branch conduits, means for controlling the fuel pressure differential across said branch conduits to regulate the rate of flow of fuel thru said main conduit, an auxiliary control device movable between first and second positions, means biasing said device to said first position, means for operating said device to said second position against said biasing means including a pair of expansible chambers separated by a movable wall, means connecting each of said chambers to one of said branch conduits at a point between said mixture control valve means and the restriction therein, so that when said mixture control valve means is in said first position said wall is moved against said biasing means when said fuel pressure differential exceeds a predetermined value, and when said selector valve means is in its second position the pressures in said chambers are equalized and said wall is positioned by said biasing means.

25. Control apparatus for an internal combustion engine, comprising a first conduit for air flowing to said engine for combustion purposes, means for producing two unequal pressures whose difference is a measure of the mass of air flowing thru said first conduit per unit time, a second conduit for fuel flowing to said engine, a plurality of parallel branch conduits connected to said second conduit, each said branch conduit including a fixed metering restriction, means responsive to said difference of pressures for controlling the pressure differential across said restrictions and hence the quantity of fuel flowing therethru, means including a variable restriction for controlling the flow thru one of said branch conduits to control the ratio of fuel to air supplied to said engine, ignition timing control means, a pair of expansible chambers separated by a movable wall, a pair of passages connecting said chambers to said one branch conduit at the opposite sides of one of said restrictions, and means including said movable wall for operating said ignition timing control means to advance said timing when the flow thru said branch conduit is decreased by said variable restriction, and to retard said timing when the flow thru said branch conduit is increased.

26. In a fuel supply system for an internal combustion engine, a main fuel conduit, a pair of parallel branch conduits connected to said fuel conduit, selector valve means movable between a first position wherein fuel may flow only thru one of said branch conduits and a second position wherein fuel may flow thru both of said branch conduits, a metering restriction in each of said branch conduits, means for controlling the fuel pressure differential across said branch conduits to regulate the rate of flow of fuel thru said main conduit, an enrichment valve connected in parallel with the restriction in said one branch conduit and movable between closed and open positions, means biasing said enrichment valve to said closed position, means for operating said enrichment valve toward open position against said biasing means including a pair of expansible chambers separated by a movable wall, and means connecting each of said chambers to one of said branch conduits at a point between the restriction therein and said selector valve means, so that when said selector valve means is in said first position said wall is subject to said fuel presure differential, and when said selector valve means is in its second position the wall is subject to equal pressures on its opposite sides.

27. In a fuel supply system for an internal combustion engine, a main fuel conduit, a pair of parallel branch conduits connected to said fuel conduit, mixture control valve means movable between a first position wherein fuel may flow only thru one of said branch conduits and a second position wherein fuel may flow thru both of said branch conduits, a metering restriction in each of said branch conduits, means for controlling the fuel pressure differential across said branch conduits to regulate the rate of flow of fuel thru said main conduit, ignition timing control means movable between normal timing and advanced timing positions, means biasing said ignition timing control means to its normal timing position, means for operating said ignition timing control means toward said advanced timing position against said biasing means including a pair of expansible chambers separated by a movable wall, means connecting each of said chambers to one of said branch conduits at a point between said mixture control valve means and the restriction therein, so that when said mixture control valve means is in said first position said wall is moved against said biasing means when said fuel pressure differential exceeds a predetermined value, and when said mixture control valve means is in its second position the pressures in said chambers are equalized and said ignition timing control means is moved to its normal timing position by said biasing means.

28. Control apparatus for an internal combustion engine, comprising ignition timing control means movable between normal timing and advanced timing positions, spring means biasing said ignition timing control means to its normal timing position, means for producing two unequal pressures whose difference is a measure of the rate of flow of combustion air to said engine, means for operating said ignition timing control means against said spring including two expansible chambers separated by a movable wall, means for communicating said two unequal pressures to said two chambers, respectively, so that said ignition timing control means is moved to its advanced timing position when the difference of said pressures exceeds a predetermined value, a by-pass connection between said two chambers, and means responsive to the difference of said pressures for opening said by-pass connection to equalize the pressures in said two chambers when said pressure difference exceeds a second predetermined value greater than said first value, so that said spring operates said ignition timing control means to its normal position.

29. Control apparatus for an internal combustion engine, comprising electrical means for controlling the ignition timing of said engine, means including an electrical circuit for energizing said electrical means, and means responsive to the rate of flow of combustion air to said engine and to the fuel-to-air ratio of the combustible mixture supplied to said engine for controlling the energization of said circuit.

30. Control apparatus for an internal combustion engine, comprising ignition timing control means movable between a normal timing position and an advanced timing position, enrichment valve means movable between closed and open positions in response to a condition indicative of the engine power output and effective when open to increase the ratio of fuel to air supplied to the engine, manually operable means for additionally varying the ratio of fuel to air supplied to said engine, said manually operable means being movable between a normal fuel-air ratio position and a rich fuel-air ratio position, and means operatively connecting said ignition timing control means and said enrichment valve means to said manually operable means, said connecting means being effective upon movement of said manually operable means to said rich position to cause movement of said ignition control means to said normal timing position and to vary the response of said enrichment valve means to the engine power output.

31. Control apparatus for an internal combustion engine, comprising means for controlling the flow of combustion air to said engine, ignition timing control means movable between a normal timing position and an advanced timing position, enrichment valve means movable between closed and open positions and effective when open to increase the ratio of fuel to air supplied to the engine, means responsive to the rate of flow of air to said engine for operating said ignition timing control means and said enrichment valve means, said last-named means being effective when said air flow is below a predetermined value to move said timing control means to its advanced position and to close said valve, and when said air flow exceeds said value to move said ignition timing control means to its normal position and to open said valve, manually operable means for additionally varying the ratio of fuel to air supplied to said engine, said manually operable means being movable between a normal fuel-air ratio position and a rich fuel-air ratio position, and means operatively connecting said ignition timing control means and said enrichment valve means to said manually operable means, said connecting means being effective upon movement of said manually operable means to said rich position to cause movement of said ignition control means to said normal timing position regardless of said air flow responsive means and to vary the operation of said enrichment valve means by said air flow responsive means.

32. A fuel supply system for an internal combustion engine, comprising a main fuel conduit, a pair of parallel branch conduits connected to said fuel conduit, selector valve means movable between a first position wherein fuel may flow only thru one of said branch conduits and a second position wherein fuel may flow thru both of said branch conduits, a metering restriction in each of said branch conduits, means for controlling the fuel pressure differential across said branch conduits to regulate the rate of flow of fuel thru said main conduit, an enrichment valve connected in parallel with the restriction in said one branch conduit and movable between closed and open positions, means biasing said enrichment valve to said closed position, means responsive to said fuel pressure differential for opening said enrichment valve against its biasing means when said fuel pressure differential exceeds a predetermined value, a second enrichment valve connected in parallel with the restriction in said one branch conduit, means biasing said second valve to closed position, means for operating said second enrichment valve toward open position against its biasing means, said second valve operating means being responsive to said fuel pressure differential when said selector valve means is in its first position and being so proportioned with respect to said second valve biasing means that said second valve is opened thereby at a value of said pressure differential substantially lower than that at which said first valve opens, and means effective upon movement of said selector valve means to its second position to prevent opening of said second valve by its operating means.

33. A fuel supply system for an internal combustion engine, comprising a fuel conduit, a metering restriction in said conduit, fuel flow controlling means for varying the fuel pressure differential across said restriction, an idle enrichment valve and a power enrichment valve connected in parallel with said restriction, a first spring biasing said idle enrichment valve to open position, first means responsive to said fuel pressure differential for operating said idle enrichment valve to closed position against said biasing spring and effective to close said valve when said fuel pressure differential exceeds a first predetermined value, a second spring biasing said power enrichment valve to closed position, and second means responsive to said fuel pressure differential for operating said power enrichment valve in an opening direction against said second biasing spring, said first and second springs and said first and second operating means being so related that said power enrichment valve remains closed until said fuel pressure differential exceeds a value substantially higher than that at which said idle enrichment valve closes.

MILTON E. CHANDLER.

REFERENCES CITED

The following references are of record in the file of this patent:

UNITED STATES PATENTS

| Number | Name | Date |
|---|---|---|
| Re. 22,447 | Hersey et al. | Feb. 29, 1944 |
| 2,348,006 | Hunt | May 2, 1944 |
| 1,944,397 | Berry | Jan. 23, 1934 |
| 1,755,988 | Goudard | Apr. 22, 1930 |
| 1,956,992 | Mallory | May 1, 1934 |
| 1,967,619 | Justheim | July 24, 1934 |
| 2,165,447 | Browne | July 11, 1939 |
| 2,361,227 | Mock | Oct. 24, 1944 |
| 1,308,707 | Gross | July 1, 1919 |

FOREIGN PATENTS

| Number | Country | Date |
|---|---|---|
| 523,895 | Great Britain | July 25, 1940 |

OTHER REFERENCES

"Automotive Industries," June 15, 1941, pages 620–624, volume 84, No. 12. (Copy in Patent Office Library.)